(12) United States Patent
Sarayeddine et al.

(10) Patent No.: US 12,019,241 B2
(45) Date of Patent: Jun. 25, 2024

(54) 2D-PUPIL EXPANSION LIGHT GUIDE ASSEMBLY

(71) Applicant: OPTINVENT, Rennes (FR)

(72) Inventors: Khaled Sarayeddine, Rennes (FR); Simon Julien, Rennes (FR); Yao Liu, Rennes (FR); Kayvan Mirza, Rennes (FR)

(73) Assignee: OPTINVENT, Rennes (FR)

( * ) Notice: Subject to any disclaimer, the term of this patent is extended or adjusted under 35 U.S.C. 154(b) by 101 days.

(21) Appl. No.: 17/531,082

(22) Filed: Nov. 19, 2021

(65) Prior Publication Data

US 2022/0308350 A1  Sep. 29, 2022

(30) Foreign Application Priority Data

Mar. 29, 2021 (FR) ...................................... 2103209

(51) Int. Cl.
  *G02B 27/01* (2006.01)
  *F21V 8/00* (2006.01)

(52) U.S. Cl.
  CPC ....... *G02B 27/0172* (2013.01); *G02B 6/0036* (2013.01); *G02B 6/0055* (2013.01); *G02B 27/0101* (2013.01); *G02B 2027/0123* (2013.01); *G02B 2027/0132* (2013.01)

(58) Field of Classification Search
  CPC .... G02B 2027/0123; G02B 2027/0132; G02B 27/0101; G02B 27/0172; G02B 6/0036; G02B 6/0055
  See application file for complete search history.

(56) References Cited

U.S. PATENT DOCUMENTS

| 1,069,848 A | * | 8/1913 | Brown | ...................... B65H 3/24 |
|---|---|---|---|---|
| | | | | 271/129 |
| 5,738,825 A | * | 4/1998 | Rudigier | .............. G01N 21/253 |
| | | | | 422/82.11 |

(Continued)

FOREIGN PATENT DOCUMENTS

| CN | 1664628 A | * | 9/2005 | ........... G02B 6/0043 |
|---|---|---|---|---|
| CN | 102301272 A | * | 12/2011 | ............. G02B 5/045 |

(Continued)

*Primary Examiner* — Michelle R Connelly
*Assistant Examiner* — Mary A El-Shammaa
(74) *Attorney, Agent, or Firm* — Williams Mullen; R. Brian Drozd

(57) ABSTRACT

A light guide includes a first and second transparent monolithic optical parts (TMOP). The first TMOP has a first surface having two sets with one flat surface followed by one prism array. Each flat surface has a partially-reflective coating, and the first TMOP has a flat opposite second surface. Each prism array has two prisms having a first and a second surfaces which are oblique to each other and to the first TMOP's opposite second surface. The prism arrays first surfaces have a partially-reflective coating. The second TMOP has a first surface with a geometrically complementary shape relative to the shape of the first TMOP's first surface, and has a flat opposite second surface. The first and second TMOPs are assembled together using an optically transparent adhesive material, such that the second surfaces of the first and second TMOP of the light guide assembly are parallel to each other.

18 Claims, 11 Drawing Sheets

(56) References Cited

U.S. PATENT DOCUMENTS

| | | | |
|---|---|---|---|
| 6,395,558 B1 * | 5/2002 | Duveneck | G01N 21/7743 422/82.11 |
| 6,455,004 B1 * | 9/2002 | Tiefenthaler | G01N 21/648 436/805 |
| 7,206,107 B2 * | 4/2007 | Levola | G02B 27/4277 359/566 |
| 8,433,172 B2 | 4/2013 | Pascal et al. | |
| 8,503,833 B2 * | 8/2013 | Tiefenthaler | G01N 21/6486 385/12 |
| 8,593,734 B2 * | 11/2013 | Laakkonen | G02B 27/0081 359/13 |
| 8,665,178 B1 | 3/2014 | Wang | |
| 9,285,590 B2 | 3/2016 | Dubroca et al. | |
| 9,435,955 B2 | 9/2016 | Dubroca et al. | |
| 9,927,586 B1 * | 3/2018 | Mak | G02B 6/4204 |
| 2004/0141303 A1 * | 7/2004 | Ladstaetter | F21V 5/02 257/E33.059 |
| 2009/0255568 A1 * | 10/2009 | Morgan | H01L 31/0547 136/246 |
| 2018/0374266 A1 | 12/2018 | Schowengerdt et al. | |
| 2019/0212557 A1 * | 7/2019 | Waldern | G02B 27/0101 |

FOREIGN PATENT DOCUMENTS

| | | | | |
|---|---|---|---|---|
| CN | 102713702 A | * | 10/2012 | ............ G02B 6/0043 |
| CN | 107002950 A | * | 8/2017 | ............ G02B 6/0036 |
| CN | 109416154 A | * | 3/2019 | ................ F21K 9/00 |
| WO | WO-2015129223 A1 | * | 9/2015 | ............ G02B 5/1809 |
| WO | WO-2017035206 A1 | * | 3/2017 | ............ G02B 6/0036 |
| WO | WO-2017044751 A1 | * | 3/2017 | ............... F24S 23/12 |
| WO | WO-2017094493 A1 | * | 6/2017 | ......... G02B 27/0101 |
| WO | WO-2018125624 A1 | * | 7/2018 | ............ G02B 6/0036 |
| WO | WO-2018168089 A1 | * | 9/2018 | .............. G02B 27/22 |
| WO | WO-2018181853 A1 | * | 10/2018 | ................. F21S 2/00 |

* cited by examiner

Fig. 9A
Fig. 9B
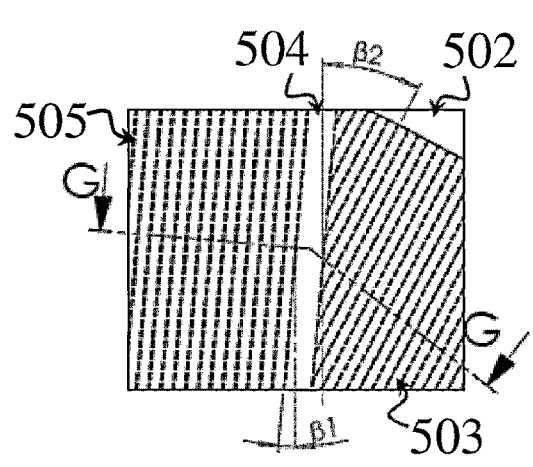
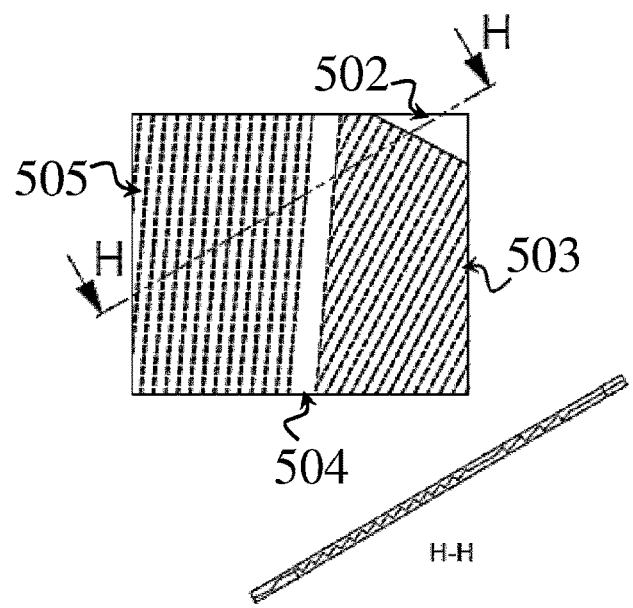
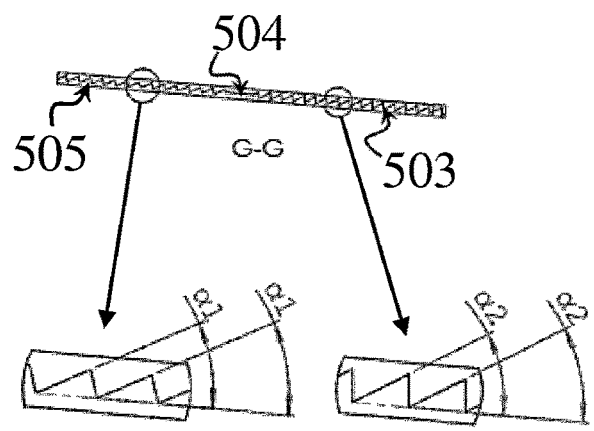
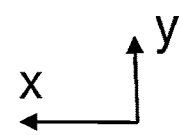

2D-PUPIL EXPANSION LIGHT GUIDE ASSEMBLY

TECHNICAL DOMAIN

The present invention relates to a light guide assembly including two complementary transparent monolithic optical parts having, on their surfaces that face each other when said two optical parts are assembled, several arrays of microstructures to provide guidance, 2D expansion and extraction of image rays.

BACKGROUND ART

Light guides (or waveguides) can be made of an optical transparent material (plastic, glass, etc.) and be used to transport rays of light by total internal reflection from one zone to another of the light guide. Such a light guide is for example used in augmented reality headsets to enable a user to see a virtual image superimposed on the real world.

Usually a display engine (or collimator system) generates a virtual image at large distance or infinity. The virtual image is in-coupled to the light guide by means of in-coupler optics. Rays of the in-coupled virtual image travel through the light guide by total internal reflection and hit an out-coupler that extracts the light in front of the user eye. The out-coupler includes prism microstructures with a semi-reflective coating on oblique surfaces of the prism microstructures to extract the image rays having the right direction in space and to project the virtual image into the user's eye.

The collimator system is generally made of an image source coupled with lenses and/or mirrors to enlarge a virtual image provided by the image source and collimate said virtual image, generally at infinity focus. The image source could be either LCOS (Liquid Crystal on Silicon), LCD (Liquid Cristal Display), OLED (Organic Light-Emitting Diode), µLED (Micro Light Emitting Diode) or MEMS (Micro opto Electro Mechanical System).

Such an arrangement is disclosed in the U.S. Pat. No. 8,433,172, as similarly depicted in FIG. 1. A light guide 100 has an upper surface 101 and a lower surface 104. The upper surface 101 includes a prism array, while the lower surface 104 is flat. Each prism of the prism array is composed of a first surface 102 and a second surface 103 which are oblique with respect to each other and with respect to the lower surface 104. The surfaces 102 of the prisms of the prism array are parallel to each other, and the surfaces 103 of the prisms of the prism array are also parallel to each other. The surfaces 103, on which a semi-reflective coating is applied, are intended to extract the virtual image rays out of the light guide and into the user's eye. No coating is applied on the surfaces 102.

Another arrangement enabling see-through effect is disclosed in the U.S. Pat. No. 9,285,590. The see-through effect (or transparency) is permitted by a first light guide part 100 that has a prism array on one 101 of its surfaces, as already shown in FIG. 1, which is covered by a partially-reflective coating applied on all its surfaces. The first light guide part is complemented by a second light guide part 200, referred to as a cover-plate, also having a prism array on one 201 of its surfaces. The prism array of the second light guide part 200 has a complementary shape to the prism array of the first light guide part 100, as illustrated in FIG. 2. The two light guide parts 100 and 200 are assembled together with a transparent glue 205 with nearly a constant thickness, such as to form a light guide assembly 210.

The prism arrays described above can be made by a diamond cut process, but are generally manufactured by molding techniques, including injection molding, injection compression molding, hot embossing, resin thermoforming or by using a UV-cured monomer.

The current market trend for smart glasses or head mounted display devices is to have large field of view displays that look like a normal pair of glasses. However, the prism arrays described in the U.S. Pat. No. 9,285,590 referenced above are unidimensional and cannot allow injecting images with large field of view, unless it is done with a very thick light guide or with a large sized collimator system. Therefore, it is necessary to provide a thin light guide close to an ophthalmic lens form factor, as well as a small size and lightweight collimator system that can fit within an eyeglass frame temple.

It is thus desirable to provide an optical solution to meet the above requirements, namely having a small sized collimator system with a small exit pupil which is in-coupled to a thin light guide, in order to allow a large field of view and large eye-box. A pupil extension in multiple directions has then to be performed inside the light guide. It is furthermore desirable to provide such an optical solution that is easy to manufacture.

SUMMARY OF THE INVENTION

It is proposed herein a light guide assembly comprising:
a first transparent monolithic optical part having a refractive index;
a second transparent monolithic optical part having the same refractive index as the first transparent monolithic optical part;
wherein
the first transparent monolithic optical part has a first surface having two successive sets composed of one flat surface followed by one prism array, the flat surface of each set has a partially-reflective coating thereon, and the first transparent monolithic optical part further has an opposite second surface that is flat,
each prism array of the first surface of the first transparent monolithic optical part has at least two prisms, each prism being composed of a first surface and a second surface which are oblique with respect to each other and with respect to said opposite second surface of the first transparent monolithic optical part, the first surfaces of the prism arrays have a partially-reflective coating thereon and the second surfaces of the prism arrays have no reflective coating thereon,
the second transparent monolithic optical part has a first surface having a geometrically complementary shape with respect to the shape of the first surface of the first transparent monolithic optical part, and the second transparent monolithic optical part of the light guide assembly further has an opposite second surface that is flat,
the first and second transparent monolithic optical parts are assembled together using an optically transparent adhesive material, such that the second surfaces of the first and second transparent monolithic optical parts of the light guide assembly are parallel to each other, the optically transparent adhesive material having the same refractive index as the first and second transparent monolithic optical parts.

Thus, the light guide assembly is an optical solution enabling using a small sized collimator system with a small exit pupil, which allows a large field of view and large eye-box. A pupil extension in multiple directions is performed inside the light guide assembly thanks to the foregoing arrangement, and the light guide assembly is easy to manufacture thanks to the monolithic character of said first transparent monolithic optical parts.

In a particular embodiment, the light guide assembly comprises an in-coupling zone for in-coupling rays of a virtual image.

In a particular embodiment, the light guide assembly is such that:
  the flat surface of the last set in sequence with respect to a global direction of propagation of the rays of the virtual image in the light guide assembly, among said sets, implements a splitting-plus-expansion function with respect to the rays of the virtual image,
  the prism array of said last set in sequence implements a multiplication-plus-extraction function with respect to the rays of the virtual image,
  the flat surface of the other set implements a splitting function with respect to the rays of the virtual image, and
  the prism array of said other set implements a multiplication function with respect to the rays of the virtual image.

In a particular embodiment, for each prism array, the first surfaces of the prisms of the prism array in question are parallel to each other, and the second surfaces of the prisms of the prism array in question are also parallel to each other.

In a particular embodiment, for each prism array, the first surfaces of the prisms of the prism array in question are oblique flat surfaces.

In a particular embodiment, each first surface of the prism array of the last set in sequence is spherical and has a lower inclination by an average angle θ than the potential immediately preceding first surface of said prism array in the succession of prisms according to the global direction of propagation of the rays of the virtual image in the light guide assembly, so as to extract the virtual image at a finite distance D.

In a more particular embodiment, the prism array of the last set in sequence fulfills the following relationships:

$$R=2*n*D$$

$$\theta=\arctan(P/D)/(2*n)$$

wherein n is the refractive index of the first transparent monolithic optical part, R is a radius of the first surfaces of the prism array of the last set in sequence, and P is a constant pitch between any successive prisms of the prism array of the last set in sequence.

In a particular embodiment, the prism arrays have different orientations in a x,y plane of a reference direct orthonormal coordinate system of the light guide assembly defining x, y and z directions, and wherein thickness of the light guide assembly lies in the z direction of said reference direct orthonormal coordinate system.

In a particular embodiment, another prism array is placed upstream, with respect to the global direction of propagation of the rays of the virtual image in the light guide assembly, the sets of two successive sets composed of one flat surface followed by one prism array, wherein each prism of said another prism array being composed of a first surface and a second surface which are oblique with respect to each other and with respect to said opposite second surface of the first transparent monolithic optical part, the first surfaces of said another prism array have a partially-reflective coating thereon and the second surfaces of said another prism array have no reflective coating thereon, and wherein said another prism array implements a multiplication function with respect to the rays of the virtual image.

In a particular embodiment, the light guide assembly comprises an in-coupler in a form of an in-coupling prism embedded into the light guide assembly by the complementary shapes of the first and second monolithic transparent optical parts of the light guide assembly.

In a more particular embodiment, the in-coupling prism has a reflective surface on an external surface thereof.

In a particular embodiment, a transparent wedge prism is assembled to the in-coupling prism, the transparent wedge prism has an external surface with a fully-reflective coating or a mirror, wherein the transparent wedge prism is composed of a material selected as a function of:
  a difference of parallelism of an equivalent prism to which the light guide assembly is equivalent when an in-coupled field zero is not perpendicular to the second surfaces of the first and second transparent monolithic optical parts and when an extracted field zero is also not perpendicular to the second surfaces of the first and second transparent monolithic optical parts,
  a difference between a refractive index of the transparent wedge prism with the refractive index of the first and second transparent monolithic optical parts, and
  a difference between an Abbe number between their respective materials.

In a particular embodiment, a vision correction lens is assembled with the light guide assembly to correct user's vision for both the rays of the virtual image which are extracted from light guide assembly and see-through effect rays crossing the light guide assembly.

It is further proposed herein a display module formed by an assembly of the foregoing light guide and a collimator system, wherein the collimator system is arranged with the light guide assembly for projecting a virtual image at infinity and in-coupling rays thereof in the light guide assembly.

It is further proposed herein a head mounted display comprising the foregoing display module configured for right eye vision and/or the foregoing display module configured for left eye vision.

It is further proposed herein a method for manufacturing a light guide assembly, comprising:
  performing a manufacturing process to manufacture a first transparent monolithic optical part having a refractive index and a second transparent monolithic optical part having the same refractive index as the first transparent monolithic optical part;
  wherein following the manufacturing process
  the first transparent monolithic optical part has a first surface having two successive sets composed of one flat surface followed by one prism array, and the first transparent monolithic optical part further has an opposite second surface that is flat,
  each prism array of the first surface of the first transparent monolithic optical part has at least two prisms, each prism being composed of a first surface and a second surface which are oblique with respect to each other and with respect to said opposite second surface of the first transparent monolithic optical part,
  the second transparent monolithic optical part has a first surface having a geometrically complementary shape with respect to the shape of the first surface of the first transparent monolithic optical part, and the second transparent monolithic optical part of the light guide assembly further has an opposite second surface that is flat, wherein the manufacturing process further comprises:
applying a partially-reflective coating on the flat surface of each set and on the first surfaces of the prism arrays, while the second surfaces of the prism arrays have no reflective coating thereon,
assembling the first and second transparent monolithic optical parts together using an optically transparent adhesive material, such that the second surfaces of the first and second transparent monolithic optical parts of the light guide assembly are parallel to each other, the optically transparent adhesive material having the same refractive index as the first and second transparent monolithic optical parts.

It is further proposed herein a light guide assembly comprising:
a first transparent monolithic optical part having a refractive index;
a second transparent monolithic optical part having the same refractive index as the first transparent monolithic optical part;
wherein
the first transparent monolithic optical part has a first surface having two successive sets composed of one flat surface followed by one prism array, and the first transparent monolithic optical part further has an opposite second surface that is flat,
each prism array of the first surface of the first transparent monolithic optical part has at least two prisms, each prism being composed of a first surface and a second surface which are oblique with respect to each other and with respect to said opposite second surface of the first transparent monolithic optical part, the first surfaces of the prism arrays have a partially-reflective coating thereon and the second surfaces of the prism arrays have no reflective coating thereon,
the second transparent monolithic optical part has a first surface having a geometrically complementary shape with respect to the shape of the first surface of the first transparent monolithic optical part, and the second transparent monolithic optical part of the light guide assembly further has an opposite second surface that is flat,
wherein parts of the first surface of the second transparent monolithic optical part which face the flat surfaces of the sets on the first surface of the first transparent monolithic optical part, have a partially-reflective coating thereon,
the first and second transparent monolithic optical parts are assembled together using an optically transparent adhesive material, such that the second surfaces of the first and second transparent monolithic optical parts of the light guide assembly are parallel to each other, the optically transparent adhesive material having the same refractive index as the first and second transparent monolithic optical parts.

It is further proposed herein a method for manufacturing a light guide assembly, comprising:
performing a manufacturing process to manufacture a first transparent monolithic optical part having a refractive index and a second transparent monolithic optical part having the same refractive index as the first transparent monolithic optical part;
wherein following the manufacturing process
the first transparent monolithic optical part has a first surface having two successive sets composed of one flat surface followed by one prism array, and the first transparent monolithic optical part further has an opposite second surface that is flat,
each prism array of the first surface of the first transparent monolithic optical part has at least two prisms, each prism being composed of a first surface and a second surface which are oblique with respect to each other and with respect to said opposite second surface of the first transparent monolithic optical part,
the second transparent monolithic optical part has a first surface having a geometrically complementary shape with respect to the shape of the first surface of the first transparent monolithic optical part, and the second transparent monolithic optical part of the light guide assembly further has an opposite second surface that is flat,
wherein the manufacturing process further comprises:
applying a partially-reflective coating on the first surfaces of the prism arrays, while the second surfaces of the prism arrays have no reflective coating thereon, and further applying the partially-reflective coating on parts of the first surface of the second transparent monolithic optical part which are intended to face the flat surfaces of the sets on the first surface of the first transparent monolithic optical part,
assembling the first and second transparent monolithic optical parts together using an optically transparent adhesive material, such that the second surfaces of the first and second transparent monolithic optical parts of the light guide assembly are parallel to each other, the optically transparent adhesive material having the same refractive index as the first and second transparent monolithic optical parts.

DESCRIPTION OF THE DRAWINGS

The characteristics of the invention will emerge more clearly from a reading of the following disclosure of at least one embodiment, said disclosure being produced with reference to the accompanying drawings, among which:

FIGS. 9A and 9B schematically represents top views, as well as a two cross sections, of an arrangement of the I50, O-O, I50' and X-X elements of a light guide assembly embodiment;

DESCRIPTION OF EMBODIMENTS

Figure 1:
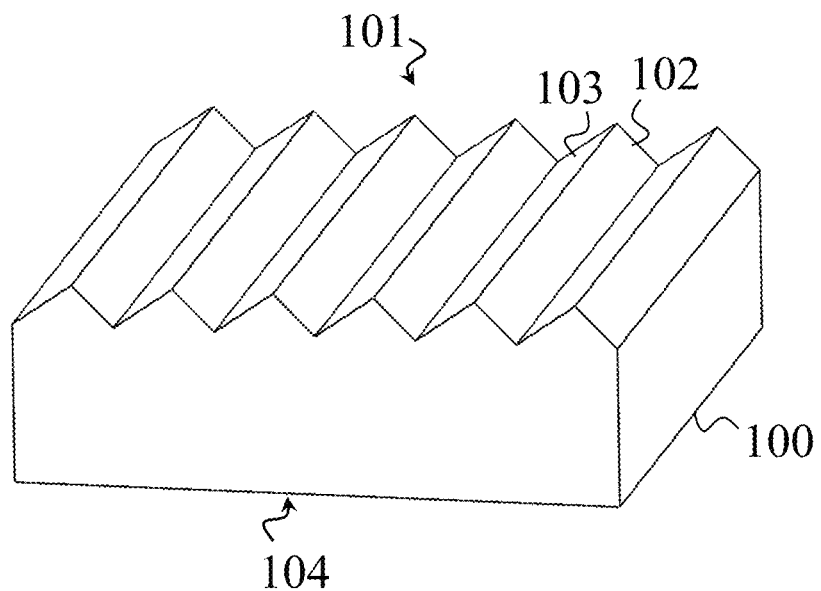
FIG. 1 schematically represents a first prior art arrangement.
Figure 2:
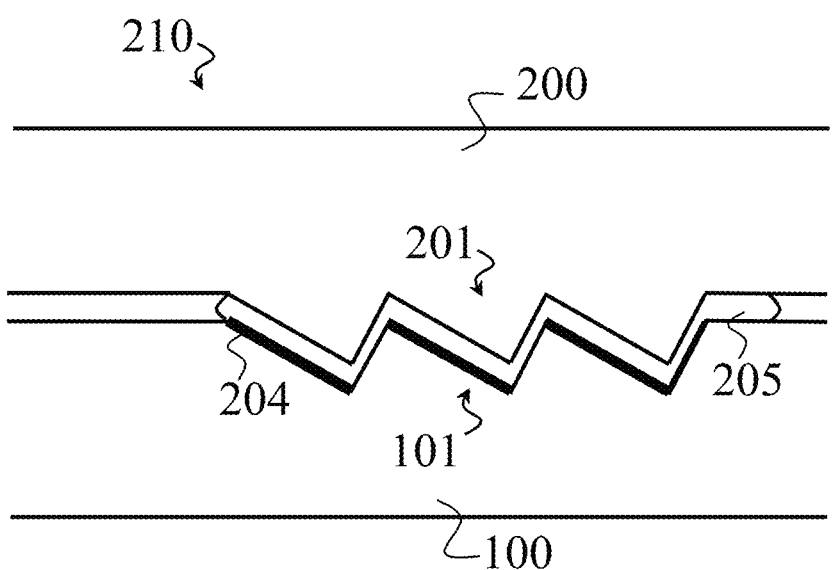
FIG. 2 schematically represents a second prior art arrangement.

It is an object of this invention to provide a light guide assembly, in which a virtual image is in-coupled and rays thereof are expanded and propagated, and from which said rays are extracted to a predefined eye-box. The light guide assembly is made with first and second transparent monolithic optical parts having the same refractive index, and in which rays of a collimated image are in-coupled. The in-coupled rays of the virtual image propagate inside the light guide assembly by total internal reflection from an in-coupled zone to an out-coupled zone where said rays are extracted from the light guide assembly.

The first transparent monolithic optical part of the light guide assembly has a first surface having two successive sets, wherein each set is composed of one flat surface followed by one prism array. The flat surface of each set has a partially-reflective coating thereon. The first transparent monolithic optical part of the light guide assembly further has a second opposite flat surface.

Each prism array of the first surface of said first transparent monolithic optical part has at least two prisms. Each prism is composed of a first surface and a second surface which are oblique with respect to each other and with respect to said second opposite surface. In one particular embodiment, the first surfaces of the prisms of the prism array in question are parallel to each other, and the second surfaces of the prisms of the prism array in question are also parallel to each other. In one embodiment, the first surfaces of the prisms of the prism array in question are oblique flat surfaces. In other embodiments, the first and second surfaces of the prisms of the prism array in question have other shapes. The first surfaces of the prism arrays have a partially-reflective coating thereon. The second surfaces of the prism arrays have no reflective coating thereon (except some coating residuals due to inaccuracy of the manufacturing process). The first surfaces of the prism arrays are referred to as the active surfaces, since rays hitting said first surfaces are reflected, either for rays expansion or for rays extraction. The second surfaces of the prism arrays are referred to as the passive surfaces, since rays hitting said second surfaces are transmitted via said second surfaces.

The flat surface of the last set in sequence (with respect to the direction of propagation of the virtual image rays in the light guide assembly) among said sets is referred to as the splitting-plus-expansion surface or I50' element, and implements a splitting-plus-expansion function with respect to the rays of the virtual image. The prism array of said last set in sequence is referred to as the multiplication-plus-extraction array or X-X element implements a multiplication-plus-extraction function with respect to the rays of the virtual image. The flat surface of the other set in sequence (i.e., the first set in sequence) among said sets is referred to as the splitting surface or I50 element, and implements a splitting function with respect to the rays of the virtual image. And the prism array of said other set is referred to as the multiplication array or O-O element and implements a multiplication function with respect to the rays of the virtual image.

The second transparent monolithic optical part of the light guide assembly has a first surface having a geometrically complementary shape with respect to the shape of the first surface of the first transparent monolithic optical part of the light guide assembly. The second transparent monolithic optical part of the light guide assembly further has a second opposite flat surface.

The first and second transparent monolithic optical parts of the light guide assembly are assembled together using an optically transparent adhesive material, such as glue, such that the second surfaces of the first and second transparent monolithic optical parts of the light guide assembly are parallel to each other after the assembly. The transparent adhesive material has the same refractive index as the first and second transparent monolithic optical parts of the light guide assembly. The light guide assembly is therefore transparent for ambient rays of the external scene (real world) that are incident on either of the second surfaces of the first and second transparent monolithic optical parts of the light guide assembly.

The in-coupled rays of the virtual image split when hitting the I50 element, thus generating transmitted rays (that are not reflected by the I50 element) and reflected rays (that are reflected by the I50 element). All these rays are guided inside the light guide assembly by total internal reflection between the second surfaces of the first and second transparent monolithic optical parts of the light guide assembly. Said guided rays are reflected by the active surfaces of the O-O element, generating multiple rays having the same direction. These multiple rays then hit the I50' element, thus generating rays reflected by the I50' element in addition to rays transmitted by the I50' element. The resulting rays continue to be guided in the light guide assembly by total internal reflection and eventually hit the X-X element. Some portion (e.g., 15%) of the rays is then reflected, depending on characteristics of the coating applied, and therefore extracted from the light guide assembly by the hit prisms of the X-X element, while some other portion of the rays is transmitted and therefore continues to be guided inside the light guide assembly to be further extracted by other prisms of the X-X element.

The foregoing description applies for any ray bundle that is in-coupled into the light guide assembly. An entry pupil delivers rays of the virtual image to the in-coupled zone (e.g., injection area). Each ray direction represents one field of view. When all rays of all fields of view are emitted from the entry pupil, the rays propagate inside the light guide assembly as described above. The rays extracted out of the light guide assembly by the X-X element represent the extracted field of view, which enables projecting the virtual image through the predefined eye-box.

According to the foregoing description of the ray path inside the light guide assembly, the role of the I50 element is to expand the entry pupil size in an incidence plane of said rays. The role of the O-O element is to expand a beam made of rays coming from the entry pupil and those expanded by the I50 element in several planes parallel to an incident plane of rays incident on active surface of the O-O element. The role of the I50' element is to expand a beam of the rays out of the O-O element in the incidence plane of said rays. Finally, the role of the X-X element is to extract the guided rays out of the light guide assembly.

Figure 3:
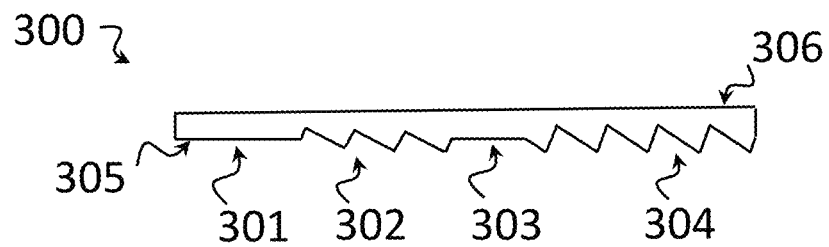
FIG. 3 schematically represents a cross section of a first transparent monolithic optical part of a light guide assembly according to an embodiment of this invention.

FIG. 3 schematically shows a cross section of the first transparent monolithic optical part 300 of the light guide assembly. The first surface 305 of the first transparent monolithic optical part 300 of the light guide assembly comprises a first prism array 302 and a second prism array 304. The prism array 302, which forms the O-O element, comprises several prisms, wherein each prism has an active surface and a passive surface. As already described above, the role of said active surfaces is to partially reflect rays due to a partially-reflective coating (typically, dielectric) applied on said active surfaces, while the role of the passive surfaces is to transmit light, since no coating is present on said passive surfaces. The non-null angle between the active surfaces of the prism array 302 of the O-O element and the second (flat) surface 306 of the first transparent monolithic optical part 300 of the light guide assembly is α2 (see FIG. 9A). The prism array 304, which forms the X-X element, comprises several prisms, wherein each prism has an active surface and a passive surface. As already described above, the role of the active surfaces is to partially reflect rays due to the coating applied thereon, while the role of the passive surfaces is to transmit rays, since no coating is present on said passive surfaces. The non-null angle between the active surfaces of the prism array 304 of the X-X element and the second (flat) surface 306 of the first transparent monolithic optical part 300 of the light guide assembly is α1 (see FIG. 9A). The prism array 302 and the prism array 304 have different orientations in a x,y plane of the light guide assembly, wherein the difference in orientation is characterized by a non-null angle β. A reference direct orthonormal coordinate system of the light guide assembly defines x, y and z directions as shown on several figures herewith, wherein the thickness of the light guide assembly lies in the z direction of said reference direct orthonormal coordinate system and wherein the x direction is intended to be substantially parallel to a virtual line crossing the centers of the user's eyes pupils. As represented herein, the non-null angle β can be separated into two complementary signed angles (depending on whether each one is considered clockwise or counterclockwise): a first signed angle β1 (see FIG. 9A), which indicates the orientation of the prism array of the X-X element with respect to the y direction, and a second signed angle β2 (see FIG. 9A), which indicates the orientation of the prism array of the O-O element with respect to the y direction.

The I50 element 301 is a part of the first surface 305 of the first transparent monolithic optical part 300 of the light guide assembly which is parallel to the second surface 306 thereof. Preferably, the distance between the part of said first surface 305 where the I50 element 301 is located and said second surface 306 is substantially equal to half the thickness of the light guide assembly. This distance is not strictly equal to half the thickness of the light guide assembly due to the presence of an adhesive material (as explained hereafter) and further due to potential manufacturing inaccuracy. Moreover, this distance could be different as far as it is coherently defined according to the transmission-reflection ratio of a partially reflected coating applied thereon (see hereafter) so as to completely fill the light guide assembly with necessary field rays.

The I50 element 301 has a partially-reflective coating, preferably with 50% transmission and 50% reflection, so as to split (e.g., equally) the incident rays during propagation inside the light guide assembly. This feature is described in the U.S. Pat. No. 9,435,955, which shows how an entry pupil is doubled by such a coating in order to reduce the size of the collimator system and to completely fill the light guide assembly with necessary field rays.

The I50' element 303 is a part of the first surface 305 of the first transparent monolithic optical part 300 of the light guide assembly which is parallel to the second surface 306 thereof. The distance between the part of said first surface 305 where the I50' element 303 is located and said second surface 306 is substantially equal to half the thickness of the light guide assembly. The I50' element 303 has a partially-reflective coating, preferably with 50% transmission and 50% reflection so as to again equally split the incident rays during propagation inside the light guide assembly.

In a variant embodiment, the partially-reflective coating of the I50 element and/or of the I50' element is present on the second transparent monolithic optical part of the light guide assembly instead of being present on the first transparent monolithic optical part 300 of the light guide assembly (which literally means that the I50 element and/or of the I50' element are parts of the second transparent monolithic optical part of the light guide assembly).

In a particular embodiment, the second surface 306 of the first transparent monolithic optical part 300 of the light guide assembly is covered by an anti-reflection coating.

Figure 4:
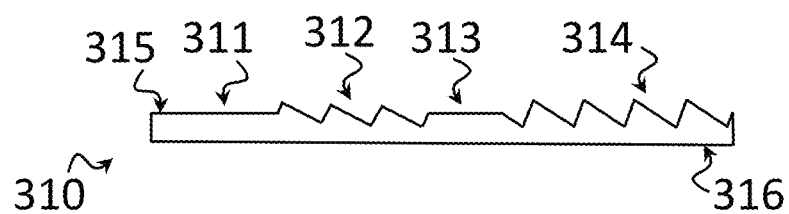
FIG. 4 schematically represents a cross section of a second transparent monolithic optical part of the light guide assembly according to an embodiment of this invention.

FIG. 4 schematically shows a cross section of the second transparent monolithic optical part 310 of the light guide assembly. The second transparent monolithic optical part 310 has a complementary shape with respect to the first transparent monolithic optical part 300. For example, the second transparent monolithic optical part 310 has a symmetrical shape with respect to the first transparent monolithic optical part 300. The first surface 315 of the second transparent monolithic optical part 310 of the light guide assembly therefore comprises a first prism array 312 and a second prism array 314. The prism array 312 has a complementary shape with respect to the prism array 302 of the first transparent monolithic optical part 300 of the light guide assembly. The prism array 314 has a complementary shape with respect to the prism array 304 of the first transparent monolithic optical part 300 of the light guide assembly. Since the second transparent monolithic optical part 310 has a complementary shape with respect to the first transparent monolithic optical part 300, the angle between the prism array 312 and the prism array 314 is −β (which can be decomposed into −β1 and −β2 with respect to the y direction and to the angles β1 and β2 used for the first transparent monolithic optical part 300). In a particular embodiment, the surfaces of the prism array 302 and of the prism array 304 are manufactured to be parallel to the respective complementary shaped surfaces of the prism array 312 and of the prism array 314 once the first transparent monolithic optical part 300 and second transparent monolithic optical part 310 are assembled to form the light guide assembly.

The first surface 315 of the second transparent monolithic optical part 310 of the light guide assembly comprises a part 311 that is intended to face the ISO surface 301 of the first surface 305 of the first transparent monolithic optical part 300 of the light guide assembly and that is therefore parallel to the second surface 316 of the second transparent monolithic optical part 310 of the light guide assembly. Said part 311 of said first surface 315 does not have a reflective coating. The distance between said part 311 of said first surface 315 and said second surface 316 is substantially equal to half the thickness of light guide assembly.

The first surface 315 of the second transparent monolithic optical part 310 of the light guide assembly comprises a part 313 that is intended to face the I50' surface 303 of the first surface 305 of the first transparent monolithic optical part 300 of the light guide assembly and that is therefore parallel to the second surface 316 of the second transparent monolithic optical part 310 of the light guide assembly. Said part 313 of said first surface 315 does not have a reflective coating. Preferably, the distance between said part 313 of said first surface 315 and said second surface 316 is substantially equal to half the thickness of light guide assembly. As for the first transparent monolithic optical part 300, this distance is not strictly equal to half the thickness of the light guide assembly due to the presence of adhesive material (as explained hereafter) and further due to potential manufacturing inaccuracy. Moreover, this distance could be different as far as it is coherently defined according to the transmission-reflection ratio of a partially reflected coating applied thereon (see hereafter) so as to completely fill the light guide assembly with necessary field rays.

In a variant embodiment (as already mentioned with respect to FIG. 3), the partially-reflective coating of the I50 element and/or of the I50' element is present on the second transparent monolithic optical part 310 of the light guide assembly instead of being present on the first transparent monolithic optical part 300 of the light guide assembly. It therefore respectively means that the aforementioned part 311 of the first surface 315 has partially-reflective coating forming the I50 element and/or the aforementioned part 313 of the first surface 315 has partially-reflective coating forming the I50 element.

In a particular embodiment, the second surface 316 of the second transparent monolithic optical part 310 of the light guide assembly is covered by an anti-reflection coating.

Figure 5:
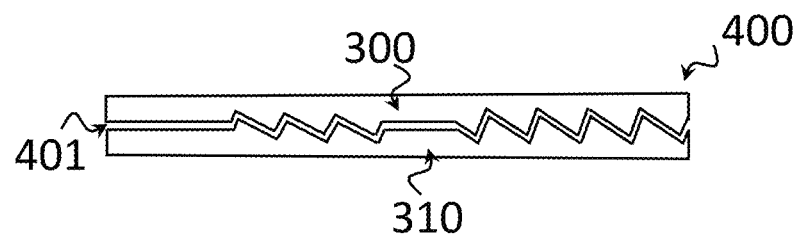
FIG. 5 schematically represents a cross section of the light guide assembly formed using the first transparent monolithic optical part in FIG. 3 and the second transparent monolithic optical part in FIG. 4.

FIG. 5 depicts a light guide assembly 400 that is formed using the first transparent monolithic optical part 300 shown in FIG. 3 and the second transparent monolithic optical part 310 shown in FIG. 4. As disclosed above, the first transparent monolithic optical part 300 has partially-reflective coating on the ISO and I50' elements, and on the active surfaces of the O-O and X-X elements, and the second transparent monolithic optical part 310 has no coating thereon. In a variant embodiment (as already mentioned with respect to FIGS. 3 and 4), the partially-reflective coating of the I50 element and/or of the I50' element is present on the second transparent monolithic optical part 310 instead of being present on the first transparent monolithic optical part 300.

The first 300 and second 310 transparent monolithic optical parts have complementary shapes and are assembled together with a transparent adhesive material 401 such that the thickness of the light guide assembly 400 is constant from the I50 element to the X-X element, wherein the refractive index of the transparent adhesive material 401 is the same as the refractive index of the first 300 and second 310 transparent monolithic optical parts (with a negligible margin). In other words, the aforementioned second surfaces 306 and 316 are parallel to each other. The light guide assembly 400 can therefore be seen as a plate embedding the I50, O-O, I50' and X-X elements inside it.

Figure 6:
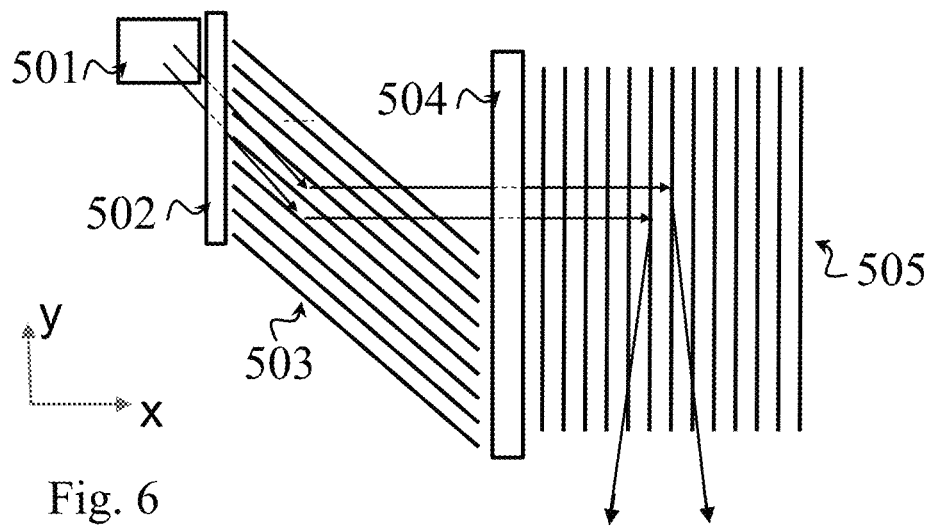
FIG. 6 schematically represents a top view of an arrangement of I50, O-O, I50' and X-X elements inside the light guide assembly according to an embodiment of this invention.

FIG. 6 depicts a schematic and simplified top view of the light guide assembly, where an in-coupling zone 501 is shown. Global propagation direction of rays inside the light guide assembly is also shown. The role of the in-coupling zone 501 is to in-couple rays of the virtual image inside the light guide assembly. When said rays enters the in-coupling zone 501, they are injected inside the substrate of the light guide assembly and propagate inside the light guide assembly by total internal reflection. The rays then hit the coating of the I50 element 502 and split into two directions due to the partially reflective character of the coating of the I50 element 502. Each in-coupled ray thus generates two rays, the one transmitted by the coating of the I50 element 502 and the other reflected by the coating of the I50 element 502. Both rays then hit the O-O element 503. Each active surface of the O-O element 503 partially reflects rays and partially transmits rays due to a partially reflective coating applied thereon, thus generating multiple rays from each incident ray to enlarge the ray beam. The resulting beam made of multiple rays out of the O-O element 503 continues to propagate inside the light guide assembly and hits the coating of the I50' element 504. Each ray out of the O-O element 503 thus splits into two directions due to the partially reflective character of the coating of the I50' element 504, one transmitted by the coating of the I50' element 504 and one reflected by the coating of the I50' element 504. Both rays then hit the X-X element 505. Some portions of the rays are then partially reflected by the active surface of prism array of the X-X element 505 due to the partially reflective coating applied on said active surfaces and are then extracted out of the light guide assembly, while some non-reflected portions of the rays continue to propagate inside the light guide assembly and hit following active surfaces of the prism array of the X-X element 505 for further extraction. Thus, all fields with different directions are partially extracted so as to form an extracted image in the eye-box. The aforementioned angles α1, α2, β1 and β2 are defined so as to avoid ghost images inside the extracted image, wherein such ghost images may be generated due to multiple partial reflections. The aforementioned angles α1, α2, β1 and β2 may be defined thanks to experimental tests. The aforementioned angles α1, α2, β1 and β2 may be otherwise determined thanks to simulations, for example using ghost image tracking. The ghost image tracking is performed by computing a unity k-vector of each field, represented by the cosine angle along x, y and z directions in a reference orthonormal coordinate system of the light guide assembly. Such computing is purely angular, whereby the reflection of the k-vector on each surface of the prism arrays, on each external flat surface of the light guide assembly and on the coating of the I50 and I50' elements may show a ghost image shifted with respect to the extracted image. This computing shows some preferred values of the angles α1, α2, β1 and β2 for which no ghost images interfering with the extracted image.

As an example, a field of view of 50 degrees is in-coupled inside a light guide assembly made of plastic material having a refractive index nd=1.6422 (e.g., OKP-1 from Osaka Gas Chemical, Co, Japan). In this example, the prism array of the O-O element has a pitch of 1.66 millimeters and the prism array of the X-X element has a pitch of 1.76 millimeters. The in-coupled chief ray of the virtual image are perpendicular to the external flat surfaces of the light guide assembly and the chief ray of the extracted image are also perpendicular to the external flat surfaces of the light guide assembly. By selecting α1=34 degrees, α2=25.5 degrees, β1=0 and β2=−65 degrees, it is possible to obtain an extracted image without any ghost image.

Figure 7A:
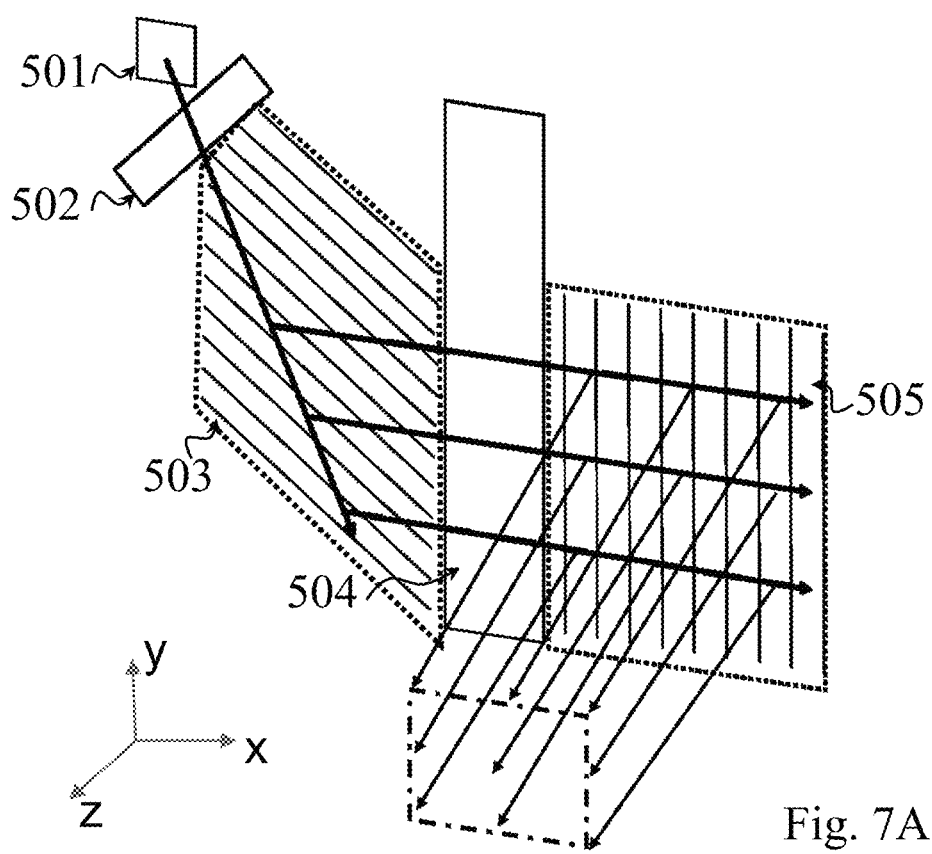
FIGS. 7A and 7B schematically represent perspective views of the arrangement of the I50, O-O, I50' and X-X elements shown in FIG. 6, further showing extraction of rays to form an eye-box.
Figure 7B:
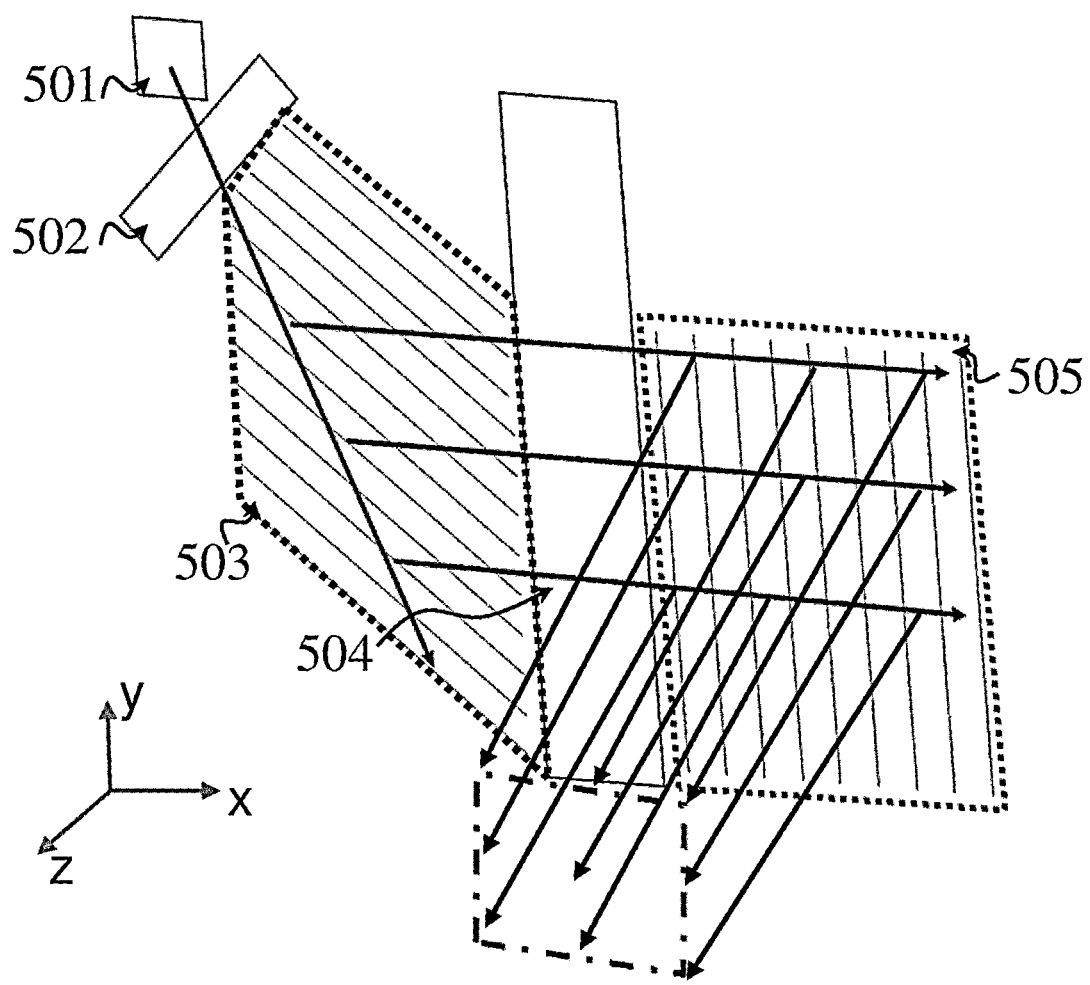

FIG. 7A depicts a perspective view of the embodiment of FIG. 6, whereby global propagation direction of rays inside the light guide assembly, as well as extracted rays are shown. The rays of the virtual image are in-coupled by an in-coupler. The in-coupler is preferably embedded in the light guide assembly and formed by combination of the complementary shapes of the first 300 and second 310 transparent monolithic optical parts once assembled. An embodiment is disclosed hereafter with respect to FIG. 11. The in-coupled rays are guided by total internal reflection between the two parallel faces of light guide assembly, split by the I50 area and then expended in one direction by the O-O array, then they are split again by the I50' area and finally partially extracted out of the light guide to fill in a large area called the eye-box or eye motion box. The eye-box should be large for maximum visual comfort for the user. For example, the eye-box should have a size of 11 mm×7 mm for an image of 50 degrees field of view. The eye-box location is usually between 15 mm and 25 mm from the user's eye (eye relief). All the fields, or beam directions, should be present in the eye-box to avoid missing any part of the extracted image and to reduce vignetting of the image border. FIG. 7B depicts a variant perspective view, wherein the angle β1=5 degrees, whereas β1=0 degrees on FIG. 7A (the other angles are adapted accordingly).

Figure 8:
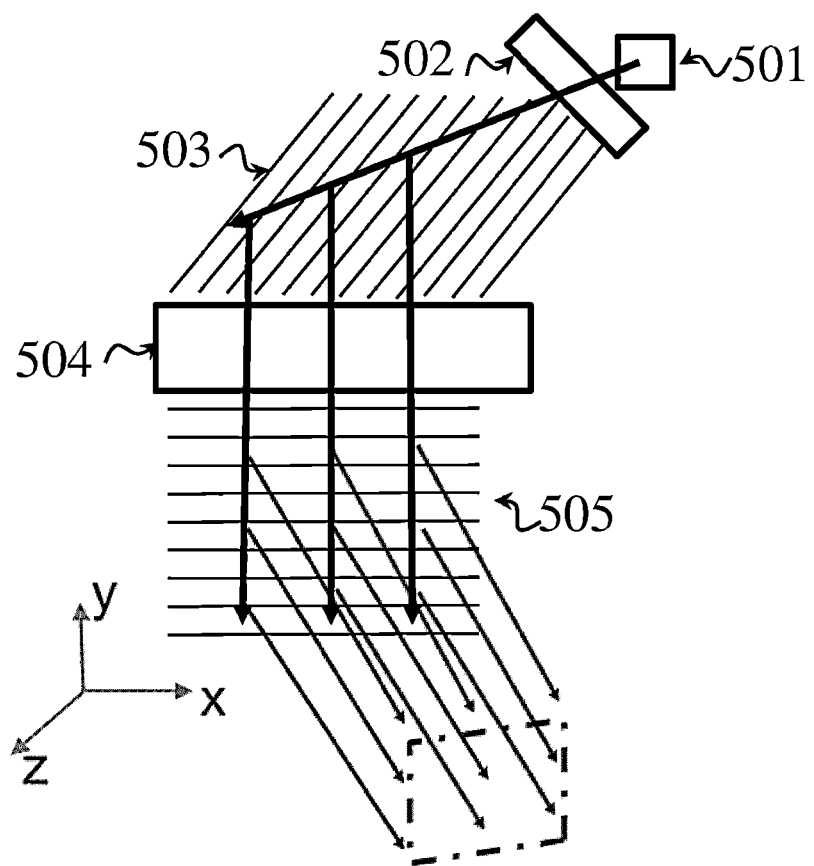
FIG. 8 schematically represents a perspective view of another arrangement of the I50, O-O, I50' and X-X elements inside the light guide assembly according to an embodiment of this invention.

FIG. 8 depicts another embodiment where the arrangement of the O-O and X-X elements is slightly different from the arrangement shown in FIG. 7A. Considering that the x direction is horizontal (in the orthogonal reference of the light guide assembly), the prism ridges of the X-X element substantially extend horizontally in FIG. 8, whereas they substantially extend vertically in FIG. 7A. The choice between these horizontal and vertical arrangements depends on several parameters, such as the required final shape of the light guide assembly, the image format of the extracted image and finally on the clearance of the final display when integrated into smart glasses or an Augmented Reality (AR) Head Mounted Display (HMD) or mixed-reality (XR) display or head worn display device.

FIGS. 9A and 9B illustratively show top view and respective cross sections (along axis G-G and H-H) of a same light guide assembly in one embodiment of the present invention. FIGS. 9A and 9B show the two successive sets composed of one flat surface followed by one prism array, namely the I50 and O-O elements on one hand, and the I50' and X-X elements on the other hand. At the bottom of FIG. 9A, a cross section obtained according to a broken section line G-G that is perpendicular to the orientations of the prim arrays of the O-O and X-X elements is shown, wherein the actual pitch of the prism arrays of the O-O and X-X elements is shown. At the bottom of FIG. 9B, another cross section obtained according to a straight cross section line H-H shows in cross section view the two successive sets composed of one flat surface followed by one prism array, namely the I50 and O-O elements on one hand, and the I50' and X-X elements on the other hand.

Figure 9C:
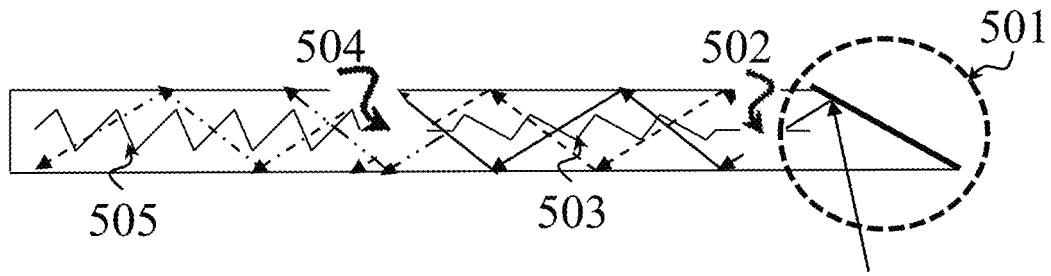
FIG. 9C schematically represents a cross section, as in FIG. 9B, where reflections and propagation of rays are shown.

FIG. 9C depicts a cross section along dashed lines (as in FIG. 9B) along the prisms of the O-O and X-X elements of the light guide assembly, whereby a ray trace is shown. Rays of the virtual image are in-coupled via the in-coupling zone 501. The in-coupled ray splits when reaching the partially-reflective coating of the I50 element and continues propagating by total internal reflection, then hits the active surfaces of the O-O element to generate other rays. These generated other rays split again when reaching the partially reflective coating of the I50' element before reaching the active surfaces of the X-X element, from where they are partially extracted.

Figure 10:
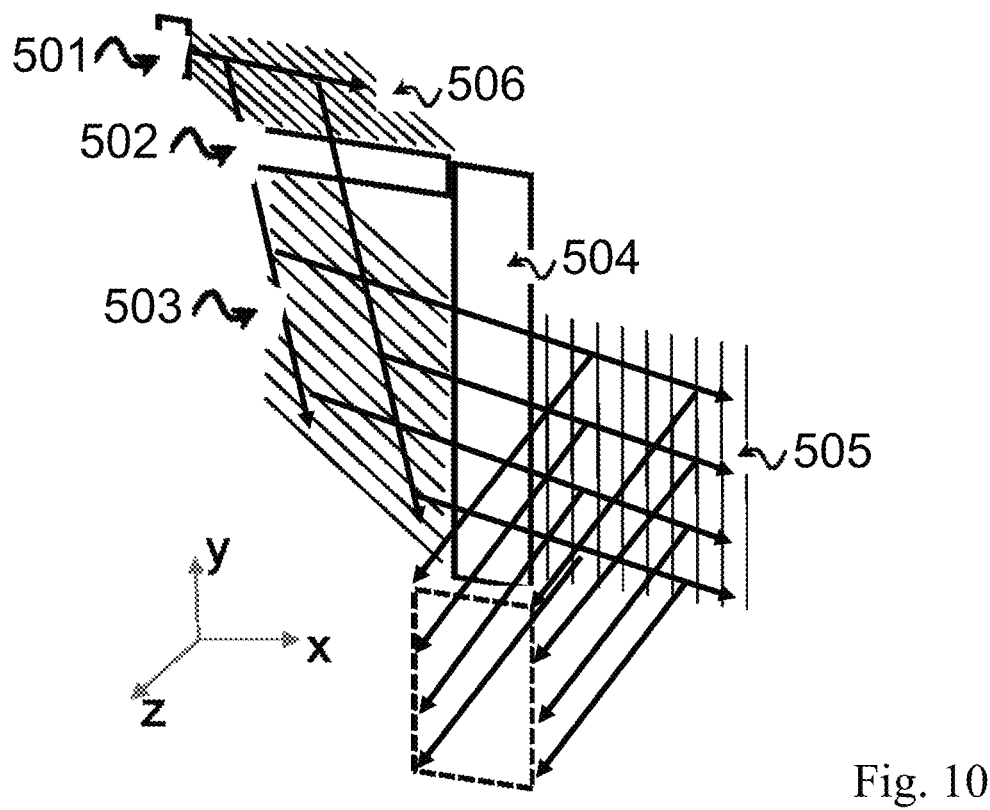
FIG. 10 schematically represents a perspective view of an arrangement with more prism arrays in the light guide assembly according to an embodiment of this invention.

In FIG. 10, more than two prism arrays are present in the light guide assembly. Here the virtual image rays are in-coupled and then hit the active surfaces of another prism array, referred herein to as O-O' element 506, placed upstream (with respect to global virtual image rays propagation in the light guide assembly) the sets of two successive sets composed of one flat surface followed by one prism array, namely the ISO and O-O elements on one hand, and the I50' and X-X elements on the other hand. The O-O' element 506 acts as the O-O element and has the same function. The O-O' element and the O-O element have different orientations in the x,y plan. After having been reflected by the O-O' element 506, the rays hit the I50 element, followed by the O-O element followed by the I50' element and the X-X element as already described above. The advantage of such an embodiment is to further expand rays' beam and adapt expansion areas to the final external shape of the light guide assembly in front of the user's eye.

Figure 11:
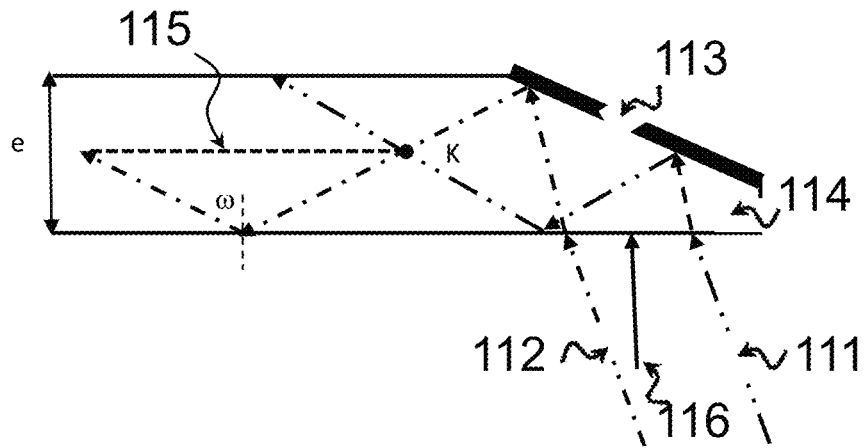
FIG. 11 schematically represents a cross section of an arrangement of an in-coupling zone of the light guide assembly, wherein a position of the I50 element is further shown, according to an embodiment of this invention.

In FIG. 11, an embodiment of an in-coupler is shown. The in-coupler has a reflective surface on an in-coupling prism 114 embedded into the light guide assembly by the complementary shapes of the first and second monolithic transparent optical parts of the light guide assembly. In this case a fully reflecting coating is applied to an external surface 113 of the in-coupling prism 114 so as to form an in-coupling mirror that guides all rays of the virtual image inside the light guide assembly. The dashed line on FIG. 11 represents the partially-reflective coating 115 of the I50 element, the role of which being to generate additional rays to fill in the light guide assembly with a smaller entry pupil while maintaining a small light guide assembly thickness. The position of the coating 115 of the I50 element, as well as the length thereof, can be determined as follows. The length is fixed greater than or equal to e*TAN(ω), where ω is the largest incident angle of virtual image rays, with respect to the field of view of the image rays, on the aforementioned flat second surfaces 306 or 316 of the light guide assembly. The starting point K of the position of the partially-reflective coating 115 of the I50 element (with respect to the in-coupler location) is located at the intersection between the largest field ray 112 directly reflected by the in-coupling mirror with another largest field ray 111 (both rays are parallel) that is reflected by the in-coupling mirror and reflected again by one flat external surface of the light guide assembly by total internal reflection. The distance between the ray 111 and the ray 112 is the entry pupil width.

In a variant embodiment, the rays of the virtual image are in-coupled via said external surface of the in-coupling prism 114 instead of using the aforementioned in-coupling mirror. It depends on which side of the light guide assembly a collimator system has to be assembled with the light guide assembly.

Figure 12:
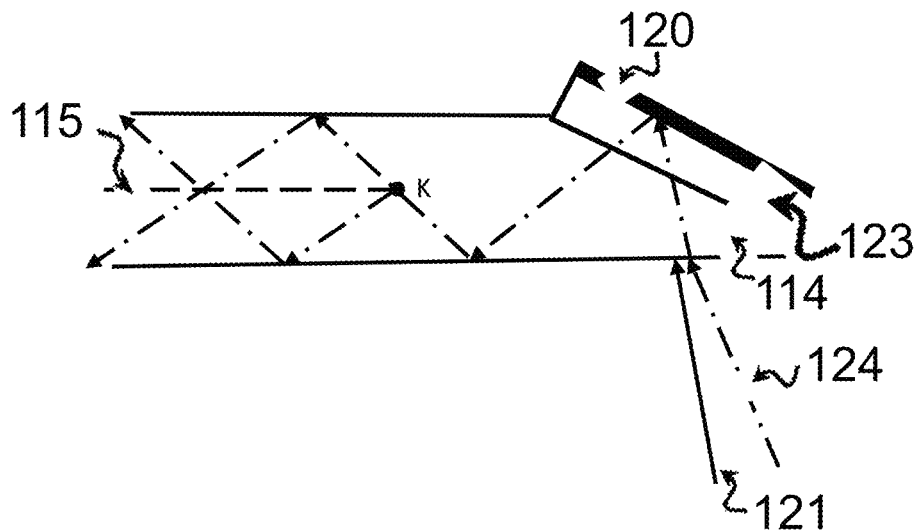
FIG. 12 schematically represents a cross section of another arrangement of the in-coupling area zone of the light guide assembly, according to an embodiment of this invention.

The FIG. 11 arrangement works well when the collimator system is assembled with the light guide assembly such that the in-coupled field zero 116 (or centric ray of the in-coupled virtual image, also referred to as the chief ray) is perpendicular to the external flat surfaces of the light guide assembly and the extracted field zero (or centric ray of the extracted image, also referred to as the chief ray) is also perpendicular to the external flat surfaces of the light guide assembly. However, when the in-coupled field zero is not perpendicular to the external flat surfaces of the light guide assembly and the extracted field zero is also not perpendicular to the external flat surfaces of the light guide assembly, the arrangement of FIG. 11 may generate color aberrations since the light guide assembly is no more equivalent to a medium with parallel diopters. When equivalent to a medium with non-parallel diopter, the light guide assembly is like an equivalent thin prism of the same material as the light guide assembly, which generates color aberrations. To correct said color aberrations, a transparent wedge prism 123 may be assembled to the light guide assembly and more particularly to the in-coupling prism 114, as depicted in FIG. 12. Here, the in-coupling prism 114 has no reflective coating thereon and the transparent wedge prism 123 has an external surface 120, with a fully-reflective coating or a mirror, that fully reflects the virtual image rays. The selection of the material of the transparent wedge prism 123 is a function of the difference of parallelism of the equivalent prism, of the difference between the refractive index of the transparent wedge prism with the refractive index of the light guide assembly, as well as of the difference between the Abbe number between their respective materials. FIG. 12 depicts such an arrangement, where a non-perpendicular chief ray 121 is in-coupled to the light guide assembly. Here again, the position of the point K is defined as the starting point of the partially-reflective coating of the I50 element and results from the intersection of largest incident angle of virtual image ray 124 when in-coupled in the light guide assembly inside the in-coupling zone.

Figure 13:
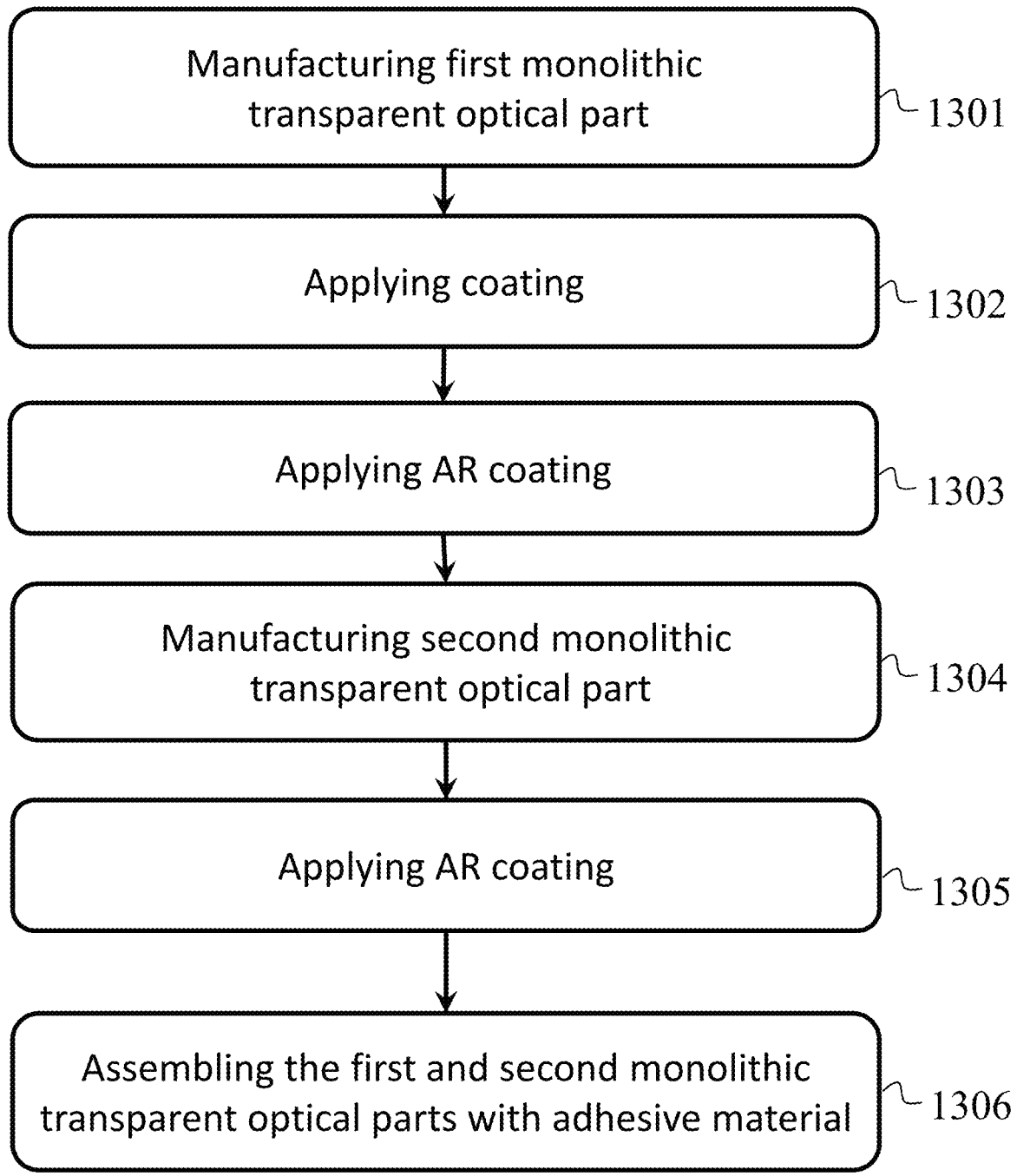
FIG. 13 schematically represents a method for providing the light guide assembly, according to this invention.

FIG. 13 depicts a method for manufacturing and assembling the first and second monolithic optical parts of the light guide assembly.

In a step 1301, the first transparent monolithic optical part is manufactured, for example by molding techniques, including injection molding, injection compression molding, hot embossing, resin thermoforming or by using a UV-cured monomer. The first transparent monolithic optical part may also be obtained by machining a block of plastic or glass. The first transparent monolithic optical part has prism arrays on one of its external surfaces, as already detailed with respect to FIG. 3.

In a step 1302, a partially-reflective coating is applied on the first transparent monolithic optical part so as to form the aforementioned ISO and I50' elements, as well as on the prism arrays so as to form the active surfaces of the aforementioned O-O and X-X elements.

In an optional step 1303, an anti-reflection coating is applied in the other one of the external surfaces of the first transparent monolithic optical part, namely the one with no prism arrays thereon.

In a variant embodiment (as already mentioned with respect to FIGS. 3 and 4), the partially-reflective coating of the I50 element and/or of the I50' element is applied on the second transparent monolithic optical part instead of being applied on the first transparent monolithic optical part.

Figure 14:
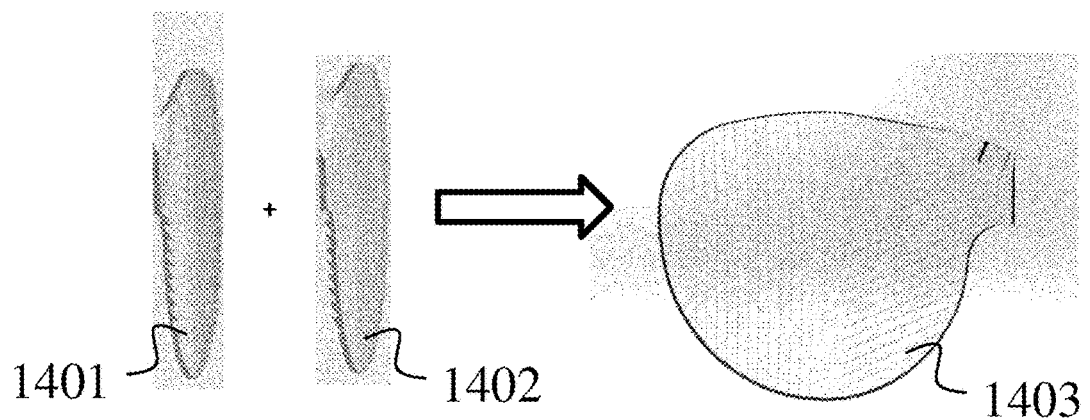
FIG. 14 schematically represents a light guide assembly obtained according to method shown in FIG. 13.

This resulting first transparent monolithic optical part is schematically shown as 1401 in FIG. 14.

In a step 1304, the second transparent monolithic optical part is manufactured, for example by molding techniques, including injection molding, injection compression molding, hot embossing, resin thermoforming or by using a UV-cured monomer. The second transparent monolithic optical part may also be obtained by machining a block of plastic or glass. The second transparent monolithic optical part has a complementary shape with respect to the first transparent monolithic optical part, as already detailed with respect to FIG. 4. The refractive index of the material used to manufacture the second transparent monolithic optical part is similar as the one of the material used to manufacture the first transparent monolithic optical part in order ensure optical continuity.

In an optional step 1305, an anti-reflection coating is applied in the other one of the external surfaces of the second transparent monolithic optical part, namely the one with no prism arrays thereon.

This resulting first transparent monolithic optical part is schematically shown as 1402 in FIG. 14.

In a step 1306, the first transparent monolithic optical part and the second transparent monolithic optical part are assembled together, using an adhesive material, such as glue. The prism arrays on the first surface of the first transparent monolithic optical part are placed opposite their complementary prism arrays on the first surface of the second transparent monolithic optical part, as already detailed with respect to FIG. 5. The refractive index of the adhesive material is similar the one of the materials used to manufacture the first and second transparent monolithic optical parts in order to ensure optical continuity. After assembling the first transparent monolithic optical part and the second transparent monolithic optical part, the light guide assembly is formed with its external surfaces (faces) plane and parallel to each other.

The resulting light guide assembly is schematically shown as 1403 in FIG. 14.

Other steps may be added in the foregoing method, such as applying coating so as to form the aforementioned in-coupling mirror.

Other steps may be added in the foregoing method, such as assembling the light guide assembly with a collimator system so as to form a display module.

Other steps may be added in the foregoing method, such as adding partially-reflective coating on parts of at least one external surface of the light guide assembly where internal reflections of the virtual image rays are intended and/or one parts of said at least one external surface of the light guide assembly where no reflections of the virtual image rays are intended. This homogenizes the transparency aspect of the light guide assembly and thus increases user's comfort.

Other steps may be added in the foregoing method, such as integrating the display module in a smart glass device or an Augmented Reality (AR) Head Mounted Display (HMD) or head worn display, either for a monocular or a binocular configuration.

Figure 15:
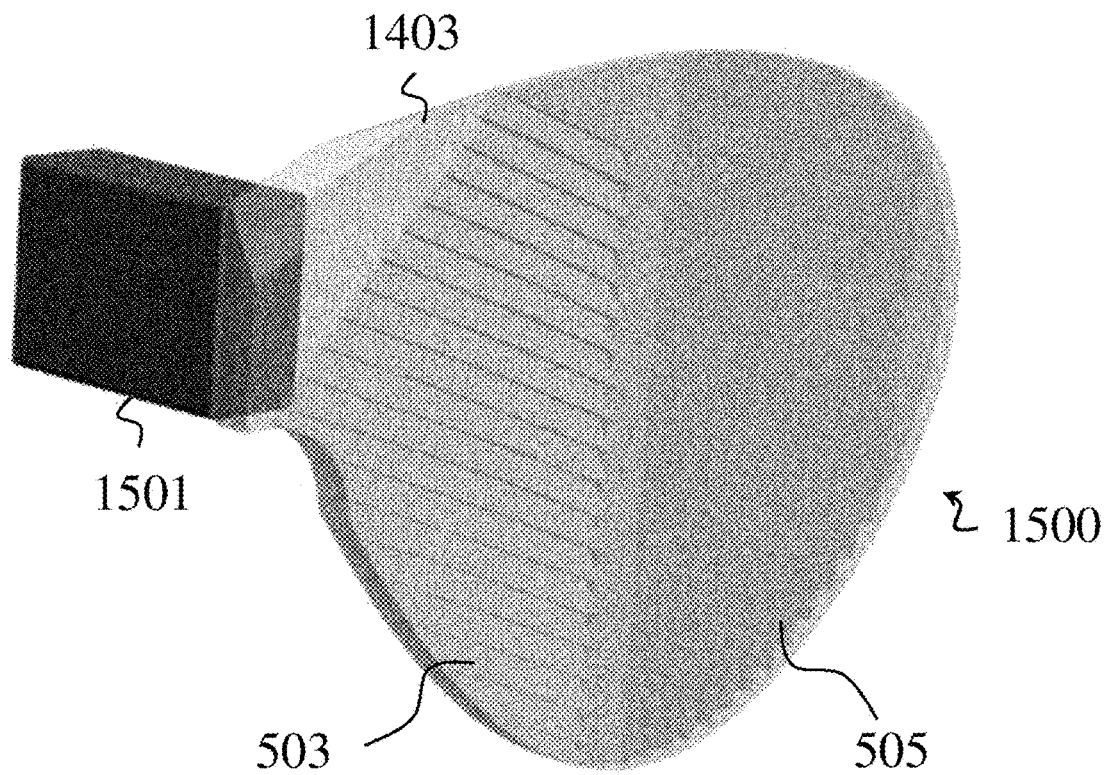
FIG. 15 schematically represents a perspective view of an example of display system including the light guide assembly, as well as a collimator system, for further integration into smart glasses or an Augmented Reality (AR) Head Mounted Display (HMD) or head worn display device.

FIG. 15 schematically represents a display module 1500. The display module 1500 is an assembly of the light guide assembly 1403, which has been obtained by executing the method disclosed above with respect to FIGS. 13 and 14, and a collimator system 1501. The collimator system 1501 is arranged with the light guide assembly 1403 for projecting a virtual image at infinity and in-coupling rays thereof in the light guide assembly so as to ensure propagation of rays as detailed above. With such an arrangement of the display module 1500, the collimator system 1501 can easily fit within an eyeglass frame temple.

Such a display module 1500 can be integrated into a smart glass device or an Augmented Reality (AR) Head Mounted Display (HMD) or head worn display, either for a monocular or a binocular configuration.

In a particular embodiment, the Head Mounted Display comprises the foregoing display module configured for right eye vision as well as the foregoing display module configured for left eye vision. In this case, the display modules are symmetrically arranged with respect to the median plan between the user's eyes. In other words, the light guide assembly for the left eye vision is structurally symmetrical to the light guide assembly for the right eye vision with respect to the median plan between the user's eyes (position of the in-coupling zones, position of the I50, O-O, I50' and X-X elements).

Figure 16:
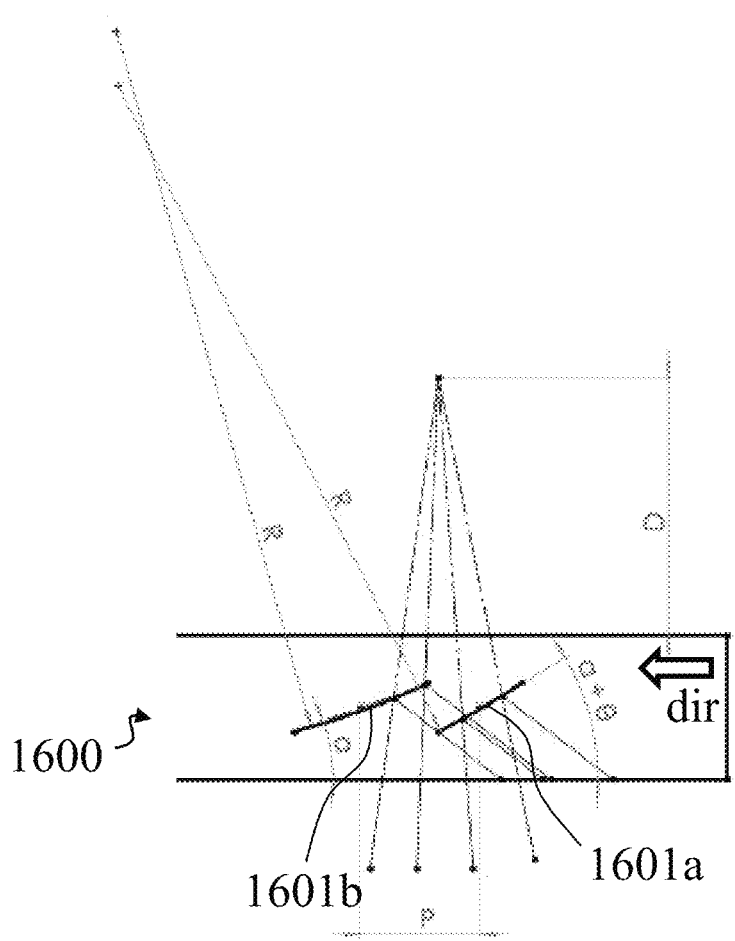
FIG. 16 schematically represents a simplified cross section of the X-X element, in a particular embodiment, wherein orientation of active surfaces of the prism array of the X-X element differs from one prism to another.

FIG. 16 schematically represents a simplified cross section of the X-X element in a particular embodiment of the invention, wherein the orientation of the active surfaces of the prism array of the X-X element differs from one prism to another (i.e., the aforementioned angle α1 differs from one prism to another). More particularly, said actives surfaces are spherical partially-reflective surfaces with the same radius of curvature R. Said spherical surfaces are preferably concave with respect to the first surface of the first transparent monolithic optical part of the light guide assembly, namely recessed in the surface of the first transparent monolithic optical part of the light guide assembly. In a variant, said spherical surfaces are convex in order to compensate for hyperopia by thus enabling projection at a negative distance.

Since the rays of the virtual image are collimated to infinity at the output of the collimator system 1501, the in-coupled rays are therefore all parallel for each field of the transported virtual image. By using a spherical partially-reflective surface 1601a of radius R inclined in the light guide assembly 1600, a part of the virtual image is extracted from the light guide assembly 1600 and is projected at a finite distance D from one external (flat) surface of the light guide assembly. Considering another spherical partially-reflective surface 1601b of radius R inclined in the light guide assembly 1600, another part of the virtual image is extracted from the light guide assembly 1600 and is also projected at the finite distance D from said external (flat) surface of the light guide assembly. And so on, so as to extract the whole virtual image and project it at the finite distance D by virtue of the prism array of the X-X element.

The prism array of the X-X element presents a constant pitch (or step) P, which means that the distance between any successive prisms of the prism array of the X-X element is constant. The active surfaces of the prism array of the X-X element are thus spherical partially-reflective surfaces arranged such that any point or pixel of the virtual image, carried by the rays extracted from the light guide assembly 1600 by said spherical partially-reflective surfaces (as symbolically illustrated in FIG. 16) focuses at a single point located at the finite distance D from the light guide assembly.

To achieve such a focus at the finite distance D, the inclination of each active surface is smaller by an average angle θ than any immediately preceding active surface in the succession of prisms in the prism array (in the direction of rays propagation "dir" in FIG. 16). Thus, the last prism in sequence (in the direction of propagation "dir" in FIG. 16) has a profile which forms an average angle α with the aforementioned second (flat) surface 306, the last but one prism in sequence has a profile which forms an average angle α+θ with the aforementioned second (flat) surface 306, etc. In other words, considering an array of M prisms, the i-th prism in sequence in the direction of propagation of the rays of the transported virtual image (in the direction of propagation "dir" in FIG. 16) has a profile that forms an average angle α+(M−i)*θ, with i=1, . . . , M, with the direction of propagation of the transported virtual image (i.e., with the aforementioned second (flat) surface 306 of the first transparent monolithic optical part).

Thus, in order to project the extracted image at the finite distance D from said external (flat) surface 306 of the light guide assembly, the following relationships have to be met:

$$R = 2*n*D$$

$$\theta = \arctan(P/D)/(2*n)$$

wherein n is the refractive index of the material from which the first transparent monolithic optical part has been manufactured.

This arrangement enables an extraction of the virtual image in-coupled into the light guide assembly 1600 at a finite distance (represented by D). The presented arrangement acts as a negative lens causing the beam of the extracted image to diverge in order to project this image at a finite distance (represented by D) when it enters the user's eye, in the manner of an ophthalmic lens (spectacle lens), but advantageously offers a solution directly integrated into the light guide assembly. In this arrangement, only the extracted image is placed at a finite distance, while the rays from the see-through effect only pass through the light guide assembly 1600, not being deflected by the proposed arrangement of the X-X element. The angle α is fixed by optical guidance conditions, in particular the placement and the expected characteristics of the collimator system 1501 in-coupling the virtual image so that the entire virtual image is guided by total internal reflection in the light guide assembly up to the X-X element.

By way of illustration, to achieve a light guide assembly that focuses the extracted virtual image at a distance D equal to 2 meters in the air, considering that the refractive index n of the material constituting the first and second transparent monolithic optical parts of the light guide assembly and the adhesive material assembling both is equal to 1.6, then the radius R is equal to 6.4 meters and the angle θ is equal to 0.014 degrees, for a pitch P equal to 1.6 millimeters.

Figure 17:
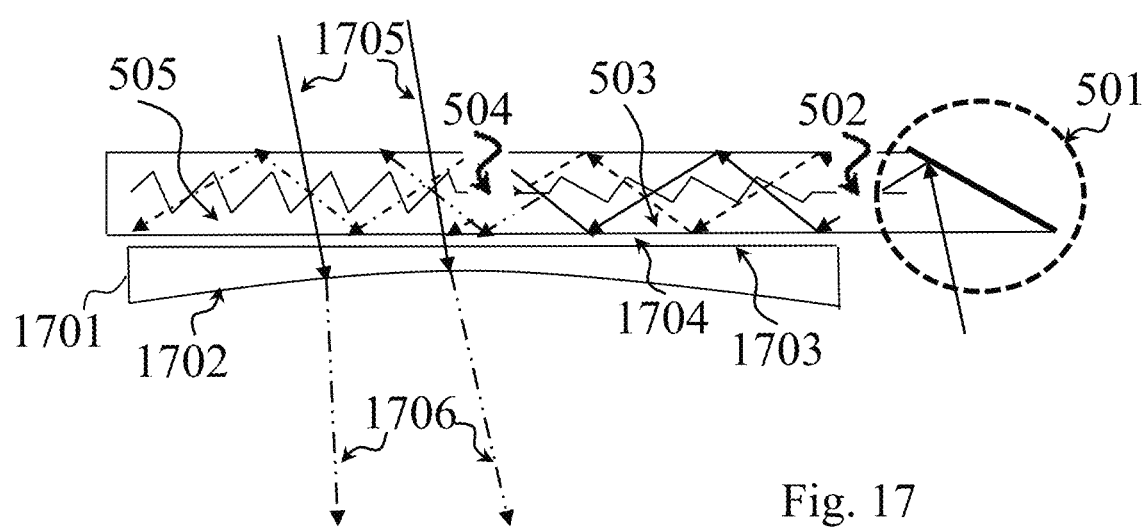
FIG. 17 schematically represents a cross section view of the light guide assembly assembled with an ophthalmic lens located between the light guide assembly and the user's eye to correct the user's vision.

FIG. 17 depicts another embodiment using the light guide assembly of FIG. 9C, where a vision correction lens 1701 is assembled with the light guide assembly to correct the user's vision for both the virtual image extracted from light guide assembly and see-through effect rays crossing the light guide assembly (external scene (real world)). The rays 1705 coming from the external scene cross the light guide assembly without being deflected since the light guide assembly is equivalent to a medium with parallel surfaces. However, when the rays 1705 hit the external surface 1702 of the vision correction lens 1701, these rays change direction according to the surface 1702 curvature in order to correct the user's vision. In the example of FIG. 17, the vision correction lens 1701 has a negative power to provide vision correction for nearsighted user. The external surface 1702 may, in a variant, have a positive curvature if the vision correction is intended for farsighted user. The vision correction lens 1702 has a flat surface 1703, opposite to the external surface 1702, which is separated from light guide assembly by air space 1704.

In an alternative embodiment, the air space 1704 is replaced by low refraction index adhesive transparent material to enable adequate total internal reflection of the virtual image rays and to fix the vision correction lens 1701 on the light guide assembly.

In yet another embodiment, the flat surface 1703 has a coating thereon which reflects rays incident at an angle larger than a critical angle of total internal reflections of the light guide assembly and which transmits rays incident at an angle below said critical angle.

The invention claimed is:

1. A light guide assembly comprising:
   a first transparent monolithic optical part having a refractive index;
   a second transparent monolithic optical part having the same refractive index as the first transparent monolithic optical part;
   wherein
   the first transparent monolithic optical part has a first surface having two successive sets composed of one flat surface followed by one prism array, the flat surface of each set has a partially-reflective coating thereon, and the first transparent monolithic optical part further has an opposite second surface that is flat,
      each prism array of the first surface of the first transparent monolithic optical part has at least two prisms, each prism being composed of a first surface and a second surface which are oblique with respect to each other and with respect to said opposite second surface of the first transparent monolithic optical part, the first surfaces of the prism arrays have a partially-reflective coating thereon and the second surfaces of the prism arrays have no reflective coating thereon,
   the second transparent monolithic optical part has a first surface having a geometrically complementary shape with respect to the shape of the first surface of the first transparent monolithic optical part, and the second transparent monolithic optical part of the light guide assembly further has an opposite second surface that is flat,
   the first and second transparent monolithic optical parts are assembled together using an optically transparent adhesive material, such that the second surfaces of the first and second transparent monolithic optical parts of the light guide assembly are parallel to each other, the optically transparent adhesive material having the same refractive index as the first and second transparent monolithic optical parts,
   wherein the light guide assembly comprises an in-coupling zone for in-coupling rays of a virtual image, and wherein:
      the flat surface of the last set in sequence with respect to a global direction of propagation of the rays of the virtual image in the light guide assembly, among said sets, implements a splitting-plus-expansion function with respect to the rays of the virtual image,
      the prism array of said last set in sequence implements a multiplication-plus-extraction function with respect to the rays of the virtual image,
      the flat surface of the other set implements a splitting function with respect to the rays of the virtual image, and
      the prism array of said other set implements a multiplication function with respect to the rays of the virtual image.

2. The light guide assembly according to claim 1, wherein, for each prism array, the first surfaces of the prisms of the prism array in question are parallel to each other, and the second surfaces of the prisms of the prism array in question are also parallel to each other.

3. The light guide assembly according to claim 1, wherein, for each prism array, the first surfaces of the prisms of the prism array in question are oblique flat surfaces.

4. The light guide assembly according to claim 1, wherein, each first surface of the prism array of the last set in sequence is spherical and has a lower inclination by an average angle θ than the potential immediately preceding first surface of said prism array in the succession of prisms according to the global direction of propagation of the rays of the virtual image in the light guide assembly, so as to extract the virtual image at a finite distance D.

5. The light guide assembly according to claim 4, wherein the prism array of the last set in sequence fulfills the following relationships:

$$R = 2*n*D$$

$$\theta = \arctan(P/D)/(2*n)$$

wherein n is the refractive index of the first transparent monolithic optical part, R is a radius of the first surfaces of the prism array of the last set in sequence, and P is a constant pitch between any successive prisms of the prism array of the last set in sequence.

6. The light guide assembly according to claim 1, wherein the prism arrays have different orientations in a x,y plane of a reference direct orthonormal coordinate system of the light guide assembly defining x, y and z directions, and wherein thickness of the light guide assembly lies in the z direction of said reference direct orthonormal coordinate system.

7. The light guide assembly according to claim 1, wherein another prism array is placed upstream, with respect to the global direction of propagation of the rays of the virtual image in the light guide assembly, the sets of two successive sets composed of one flat surface followed by one prism array, wherein each prism of said another prism array being composed of a first surface and a second surface which are oblique with respect to each other and with respect to said opposite second surface of the first transparent monolithic optical part, the first surfaces of said another prism array have a partially-reflective coating thereon and the second surfaces of said another prism array have no reflective coating thereon, and wherein said another prism array implements a multiplication function with respect to the rays of the virtual image.

8. The light guide assembly according to claim 1, comprising an in-coupler in a form of an in-coupling prism embedded into the light guide assembly by the complementary shapes of the first and second monolithic transparent optical parts of the light guide assembly.

9. The light guide assembly according to claim 8, wherein the in-coupling prism has a reflective surface on an external surface thereof.

10. The light guide assembly according to claim 8, wherein a transparent wedge prism is assembled to the in-coupling prism, the transparent wedge prism has an external surface with a fully-reflective coating or a mirror, wherein the transparent wedge prism is composed of a material selected as a function of:
   a difference of parallelism of an equivalent prism to which the light guide assembly is equivalent when an in-coupled field zero is not perpendicular to the second surfaces of the first and second transparent monolithic optical parts and when an extracted field zero is also not perpendicular to the second surfaces of the first and second transparent monolithic optical parts,
   a difference between a refractive index of the transparent wedge prism with the refractive index of the first and second transparent monolithic optical parts, and
   a difference between an Abbe number between their respective materials.

11. The light guide assembly according to claim 1, wherein a vision correction lens is assembled with the light guide assembly to correct user's vision for both the rays of the virtual image which are extracted from light guide assembly and see-through effect rays crossing the light guide assembly.

12. A display module formed by an assembly of the light guide assembly according to claim 1 and a collimator system, wherein the collimator system is arranged with the light guide assembly for projecting a virtual image at infinity and in-coupling rays thereof in the light guide assembly.

13. A head mounted display comprising the display module according to claim 12 configured for right eye vision and/or the display module according to claim 12 configured for left eye vision.

14. A method for manufacturing a light guide assembly, comprising:
performing a manufacturing process to manufacture a first transparent monolithic optical part having a refractive index and a second transparent monolithic optical part having the same refractive index as the first transparent monolithic optical part;
wherein following the manufacturing process
the first transparent monolithic optical part has a first surface having two successive sets composed of one flat surface followed by one prism array, and the first transparent monolithic optical part further has an opposite second surface that is flat,
each prism array of the first surface of the first transparent monolithic optical part has at least two prisms, each prism being composed of a first surface and a second surface which are oblique with respect to each other and with respect to said opposite second surface of the first transparent monolithic optical part,
the second transparent monolithic optical part has a first surface having a geometrically complementary shape with respect to the shape of the first surface of the first transparent monolithic optical part, and the second transparent monolithic optical part of the light guide assembly further has an opposite second surface that is flat,
wherein the manufacturing process further comprises:
applying a partially-reflective coating on the flat surface of each set and on the first surfaces of the prism arrays, while the second surfaces of the prism arrays have no reflective coating thereon,
assembling the first and second transparent monolithic optical parts together using an optically transparent adhesive material, such that the second surfaces of the first and second transparent monolithic optical parts of the light guide assembly are parallel to each other, the optically transparent adhesive material having the same refractive index as the first and second transparent monolithic optical parts,
wherein, following assembling, the light guide assembly comprises an in-coupling zone for in-coupling rays of a virtual image, and wherein:
the flat surface of the last set in sequence with respect to a global direction of propagation of the rays of the virtual image in the light guide assembly, among said sets, implements a splitting-plus-expansion function with respect to the rays of the virtual image,
the prism array of said last set in sequence implements a multiplication-plus-extraction function with respect to the rays of the virtual image,
the flat surface of the other set implements a splitting function with respect to the rays of the virtual image, and
the prism array of said other set implements a multiplication function with respect to the rays of the virtual image.

15. A light guide assembly comprising:
a first transparent monolithic optical part having a refractive index;
a second transparent monolithic optical part having the same refractive index as the first transparent monolithic optical part;
wherein
the first transparent monolithic optical part has a first surface having two successive sets composed of one flat surface followed by one prism array, and the first transparent monolithic optical part further has an opposite second surface that is flat,
each prism array of the first surface of the first transparent monolithic optical part has at least two prisms, each prism being composed of a first surface and a second surface which are oblique with respect to each other and with respect to said opposite second surface of the first transparent monolithic optical part, the first surfaces of the prism arrays have a partially-reflective coating thereon and the second surfaces of the prism arrays have no reflective coating thereon,
the second transparent monolithic optical part has a first surface having a geometrically complementary shape with respect to the shape of the first surface of the first transparent monolithic optical part, and the second transparent monolithic optical part of the light guide assembly further has an opposite second surface that is flat,
wherein parts of the first surface of the second transparent monolithic optical part which face the flat surfaces of the sets on the first surface of the first transparent monolithic optical part, have a partially-reflective coating thereon,
the first and second transparent monolithic optical parts are assembled together using an optically transparent adhesive material, such that the second surfaces of the first and second transparent monolithic optical parts of the light guide assembly are parallel to each other, the optically transparent adhesive material having the same refractive index as the first and second transparent monolithic optical parts,
wherein the light guide assembly comprises an in-coupling zone for in-coupling rays of a virtual image, and wherein,
the flat surface of the last set in sequence with respect to a global direction of propagation of the rays of the virtual image in the light guide assembly, among said sets, implements a splitting-plus-expansion function with respect to the rays of the virtual image,
the prism array of said last set in sequence implements a multiplication-plus-extraction function with respect to the rays of the virtual image,
the flat surface of the other set implements a splitting function with respect to the rays of the virtual image, and
the prism array of said other set implements a multiplication function with respect to the rays of the virtual image.

16. A method for manufacturing a light guide assembly, comprising:
performing a manufacturing process to manufacture a first transparent monolithic optical part having a refractive index and a second transparent monolithic optical part having the same refractive index as the first transparent monolithic optical part;

wherein following the manufacturing process
the first transparent monolithic optical part has a first surface having two successive sets composed of one flat surface followed by one prism array, and the first transparent monolithic optical part further has an opposite second surface that is flat, each prism array of the first surface of the first transparent monolithic optical part has at least two prisms, each prism being composed of a first surface and a second surface which are oblique with respect to each other and with respect to said opposite second surface of the first transparent monolithic optical part, the second transparent monolithic optical part has a first surface having a geometrically complementary shape with respect to the shape of the first surface of the first transparent monolithic optical part, and the second transparent monolithic optical part of the light guide assembly further has an opposite second surface that is flat, wherein the manufacturing process further comprises:
applying a partially-reflective coating on the first surfaces of the prism arrays, while the second surfaces of the prism arrays have no reflective coating thereon, and further applying the partially-reflective coating on parts of the first surface of the second transparent monolithic optical part which are intended to face the flat surfaces of the sets on the first surface of the first transparent monolithic optical part, assembling the first and second transparent monolithic optical parts together using an optically transparent adhesive material, such that the second surfaces of the first and second transparent monolithic optical parts of the light guide assembly are parallel to each other, the optically transparent adhesive material having the same refractive index as the first and second transparent monolithic optical parts, wherein, following assembling, the light guide assembly comprises an in-coupling zone for in-coupling rays of a virtual image, and wherein:
the flat surface of the last set in sequence with respect to a global direction of propagation of the rays of the virtual image in the light guide assembly, among said sets, implements a splitting-plus-expansion function with respect to the rays of the virtual image,
the prism array of said last set in sequence implements a multiplication-plus-extraction function with respect to the rays of the virtual image,
the flat surface of the other set implements a splitting function with respect to the rays of the virtual image, and
the prism array of said other set implements a multiplication function with respect to the rays of the virtual image.

17. A light guide assembly comprising:
a first transparent monolithic optical part having a refractive index;
a second transparent monolithic optical part having the same refractive index as the first transparent monolithic optical part;
wherein
the first transparent monolithic optical part has a first surface having two successive sets composed of one flat surface followed by one prism array, and the first transparent monolithic optical part further has an opposite second surface that is flat, each prism array of the first surface of the first transparent monolithic optical part has at least two prisms, each prism being composed of a first surface and a second surface which are oblique with respect to each other and with respect to said opposite second surface of the first transparent monolithic optical part, the second transparent monolithic optical part has a first surface having a geometrically complementary shape with respect to the shape of the first surface of the first transparent monolithic optical part, and the second transparent monolithic optical part of the light guide assembly further has an opposite second surface that is flat, the first and second transparent monolithic optical parts are assembled together using an optically transparent adhesive material, such that the second surfaces of the first and second transparent monolithic optical parts of the light guide assembly are parallel to each other, the optically transparent adhesive material having the same refractive index as the first and second transparent monolithic optical parts, wherein partially-reflective coating is present between the flat surface of each set of the first transparent monolithic optical part and the second transparent monolithic optical part, wherein partially-reflective coating is present between the first surfaces of the prism arrays of the first transparent monolithic optical part and the second transparent monolithic optical part, and there is no reflective coating between the second surfaces of the prism arrays of the first transparent monolithic optical part and the second transparent monolithic optical part, wherein the light guide assembly comprises an in-coupling zone for in-coupling rays of a virtual image, and wherein:
the flat surface of the last set in sequence with respect to a global direction of propagation of the rays of the virtual image in the light guide assembly, among said sets, implements a splitting-plus-expansion function with respect to the rays of the virtual image,
the prism array of said last set in sequence implements a multiplication-plus-extraction function with respect to the rays of the virtual image,
the flat surface of the other set implements a splitting function with respect to the rays of the virtual image, and
the prism array of said other set implements a multiplication function with respect to the rays of the virtual image.

18. A method for manufacturing a light guide assembly, comprising:
performing a manufacturing process to manufacture a first transparent monolithic optical part having a refractive index and a second transparent monolithic optical part having the same refractive index as the first transparent monolithic optical part;
wherein following the manufacturing process
the first transparent monolithic optical part has a first surface having two successive sets composed of one flat surface followed by one prism array, and the first transparent monolithic optical part further has an opposite second surface that is flat, each prism array of the first surface of the first transparent monolithic optical part has at least two prisms, each prism being composed of a first surface and a second surface which are oblique with respect to each other and with respect to said opposite second surface of the first transparent monolithic optical part, the second transparent monolithic optical part has a first surface having a geometrically complementary shape with respect to the shape of the first surface of the first transparent monolithic optical part, and the second transparent monolithic optical part of the light guide assembly further has an opposite second surface that is flat, wherein the manufacturing process further comprises:
applying a partially-reflective coating on the first transparent monolithic part and/or on the second transparent monolithic optical part, assembling the first and second transparent monolithic optical parts together using an optically transparent adhesive material, such that the second surfaces of the first and second transparent monolithic optical parts of the light guide assembly are parallel to each other, the optically transparent adhesive material having the same refractive index as the first and second transparent monolithic optical parts, and such that partially-reflective coating is present between the flat surface of each set of the first transparent monolithic optical part and the second transparent monolithic optical part, and partially-reflective coating is present between the first surfaces of the prism arrays of the first transparent monolithic optical part and the second transparent monolithic optical part, and there is no reflective coating between the second surfaces of the prism arrays of the first transparent monolithic optical part and the second transparent monolithic optical part, wherein, following assembling, the light guide assembly comprises an in-coupling zone for in-coupling rays of a virtual image, and wherein:
the flat surface of the last set in sequence with respect to a global direction of propagation of the rays of the virtual image in the light guide assembly, among said sets, implements a splitting-plus-expansion function with respect to the rays of the virtual image, the prism array of said last set in sequence implements a multiplication-plus-extraction function with respect to the rays of the virtual image, the flat surface of the other set implements a splitting function with respect to the rays of the virtual image, and the prism array of said other set implements a multiplication function with respect to the rays of the virtual image.

* * * * *